RICHARD L. BATES
WESLEY L. EISENMAN
*INVENTORS*

*ATTORNEY*

RICHARD L. BATES
WESLEY L. EISENMAN
*INVENTORS*

June 8, 1965  R. L. BATES ETAL  3,188,473
BLACK INFRARED RADIATION DETECTOR STANDARD
Filed March 18, 1963  3 Sheets-Sheet 3

RICHARD L. BATES
WESLEY L. EISENMAN
*INVENTORS*

BY *J. M. St. Amand*

ATTORNEY

United States Patent Office 3,188,473
Patented June 8, 1965

3,188,473
BLACK INFRARED RADIATION DETECTOR STANDARD
Richard L. Bates, La Sierra, and Wesley L. Eisenman, Riverside, Calif., assignors to the United States of America as represented by the Secretary of the Navy
Filed Mar. 18, 1963, Ser. No. 266,111
6 Claims. (Cl. 250—83.3)
(Granted under Title 35, U.S. Code (1952), sec. 266)

The invention herein described may be manufactured and used by or for the Government of the United States of America for governmental purposes without the payment of any royalties thereon or therefor.

The present invention relates to calorimeters and more particularly to a black infrared radiation detector.

One of the most important properties of an infrared detector is the manner in which its output signal varies with the wavelength of the incident energy. This spectral-response characteristic is a primary consideration in determining the usefulness of the detector.

The radiation thermocouple has been used by most infrared laboratories as a standard detector against which the spectral characteristics of other detectors are compared, and there has been a tendency to assume that the response of the thermocouple is constant over wide spectral regions. Though considerable effort has been spent on determining the optical characteristics of materials that may be used to enhance the absorptance of radiation receivers, practically no data are available on the spectral characteristics of individual thermocouples.

Interest in long-wavelength infrared detectors has raised a question as to the ability of thermocouples to function adequately as standard detectors in the long-wavelength region, and therefore the "black" detector of the present invention was developed to serve as a means for evaluating the current radiation standards. A calorimeter in the form of a 15-degree cone having its internal surface coated with colloidal graphite to enhance absorptance was constructed and evaluated for use as the "black" radiation detector.

It is an object of the invention, therefore, to provide a novel black radiation detector standard.

It is another object of the invention to provide a novel black detector as a standard for the spectral calibration of long-wavelength infrared detectors.

Other objects and many of the attendant advantages of this invention will become more readily appreciated as the same becomes better understood by reference to the following detailed description when considered in connection with the accompanying drawings wherein.

Figure 1:
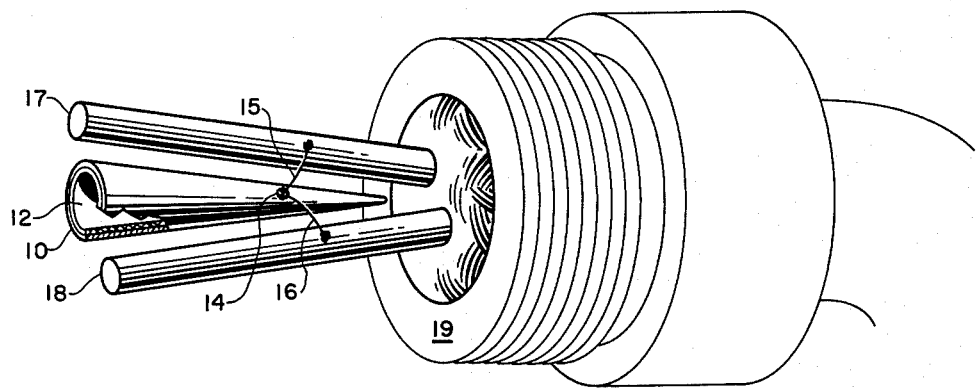
FIG. 1 shows a receiver assembly using a conical black detector.

The principal factor contributing to the blackness of the receiver is its geometry. From a fabrication standpoint, a conical cavity appears to be the most attractive, with a preliminary design requirement being that the response time of the detector be such that a modulated source could be used.

A feasible technique for making a black detector is the application of copper to a solid conical form made of material which can be dissolved, and it is also considered desirable that the fragile copper cone be mechanically supported on the form during the initial stages of fabrication. A 15-degree solid conical form can be machined from ¼-inch acrylic rod, and the fragile tip of the form finished by preliminary lathe-turning with fine emery paper and buffing with a counter-rotating cloth wheel. It has been found that a very sharp apex creates a problem in applying the copper; therefore, a flat 0.003-inch area should be left at the tip of the conical form.

The polished plastic form is then placed in a vacuum evaporator in such fashion that the side of the cone can be rotated perpendicularly to a tantalum boat containing copper. A thin coating of copper (approximately 0.5 micron) is evaporated onto the acrylic plastic form, and this evaporated copper film is then used as an electrode in an alkaline copper-plating bath. The coated cone is placed in the bath at the center of a cylindrical anode. During electroplating, the plastic form is continuously rotated to assure a uniform deposit of copper.

The copper-plated plastic cone can then be mounted in a jeweler's lathe, and the copper cut through according to the design dimensions, after which the cone is immersed in a container of trichloroethylene, which dissolves the plastic material. Finally, the remaining copper cone is rinsed in chloroform to remove any residual plastic material.

Originally, a minimum modulation frequency of 1 c.p.s. was specified for the black detector. The electroplating technique used for depositing the copper film allows accurate control of the film thickness. By controlling the current density in the plating bath and the length of deposition time, the thermal mass of the receiver is reduced until a time constant of 0.17 second is achieved for the response of the finished detector. A further reduction in response time can be achieved only at the expense of the mechanical integrity of the cone 10, FIG. 1. However, preliminary measurements indicated that satisfactory sensitivity can be obtained when the detector is used with a narrow-band amplifier having a 1-c.p.s. center frequency.

The internal surface 12 of the receiver, cone 10, is blackened by applying a material having suitable absorption characteristics throughout the spectral range of interest. Emittance measurements have been made on gold black and on a colloidal graphite material (Aqua Dag) in the region of 2 to 15 microns by an emission method. These materials were applied to flat polished copper surfaces which duplicated the internal-surface texture of the cone.

The vacuum-deposition of gold black requires particularly careful control in order to obtain coating with maximum absorptance characteristics. Moreover, depositing that material into the sharp apex of the 15-degree cone is difficult. Colloidal graphite, however, can be applied readily to the inside of the cone, and it displays adequate absorptance in the 2- to 15-micron region. Graphite material suspended in water can be applied to the cone by means of a fine camel's-hair brush.

Additional measurements have been made to determine whether the technique of applying the graphite, the thickness of the coat, or the substrate surface affected the emittance of the material. Emittance curves for samples on different substrates, with one, two, three and four coats of graphite, proved to be similar within 2 percent, which indicates that the emittance characteristics are essentially independent of these considerations. The detector was subsequently given two coats of the graphite material, and examination of the apex of cone 10 after blackening 12 indicated that the radius of curvature was approximately 0.0015 inch.

The materials used for thermocouple 14 are bismuth and bismuth with 5 percent tin, for example. Although it is not optimum, this material has adequate sensitivity and contributes a sufficiently small thermal mass. The 1-mil thermocouple wires 15 and 16 are soldered to heavy copper support wires 17 and 18 with Wood's metal, for example, by using zinc chloride as a flux. Then, in a similar manner, at a point midway between the base and the apex of the cone, the conical receiver 10 is attached directly to the thermocouple junction 14.

The detector assembly may be mounted at 19 inside a cylindrical brass enclosure on the end of a stainless-steel tube, for example. The tubing can be fixed to brass mounting base 19 having the same dimensions as the base of a standard Perkin-Elmer or Reader thermocouple. Before blackening, the mass of the conical receiver 10 was 0.25 mg. The length of cone 10 was 7.6 mm. and the diameter at the base was 2 mm. The completed detector, as shown in FIG. 1, had a responsivity of 0.05 volt/watt.

André Gouffé, as disclosed in the article "Corrections d'ouverture des corps-noirs artificiels compte tenu des diffusions multiples internes," Rev. optique, 24e année, Jan.-Mar. 1945, and others have analyzed the effective blackness of the cavity of a conical receiver which has a perfectly diffusing reflecting wall and in which the incident energy enters in a collimated beam parallel to the axis of the cone. Although this case is important in other applications, these conditions could be met only partially by the black detector. Because of the low responsivity, it was necessary to focus the incident energy into the cone, with the result that rays entered at angles considerably off the axis. Since the surface reflectance is assumed to be perfectly diffuse, this is of no great consequence. However, the small size of the particles of the graphite blackening material (approximately 2 microns in diameter) indicated that a considerable amount of specular reflection could be expected at the longer wavelengths.

The other extreme case used for evaluation purposes is that of a perfectly specular reflecting wall, with the cone irradiated by a point image lying on the cone axis at a point ($p$) from the cone aperture. The constructed cone was truncated rather than perfect, and the incoming energy was considered to have a maximum divergence of 32 degrees (this angle was defined by the optical system used with the black detector).

Figure 2A:
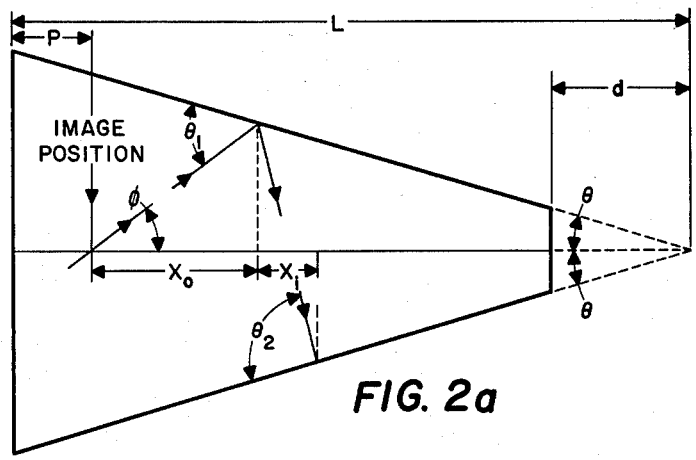
FIG. 2a is a schematic drawing showing the geometrical relationship between an incoming ray and the dimensions of the cone, as the ray travels toward the apex.

It can be seen in FIGURE 2a that as a ray travels toward the apex of the cone we have the relation $$\theta_n = \Phi + (2n-1)\theta \quad (1)$$

where $n$ is the number of reflections made by the incoming ray, $\theta_n$ is the angle of incidence for the $n$th reflection, $\theta$ is the half angle of the cone, and $\Phi$ is the original angle the ray makes with the cone axis. It can also be shown that when the ray is traveling toward the apex, the relation between the distance traveled into the cone $l$ and the number of reflections $n$ is $$l = p + \sum_{i=1}^{n} X_i \quad (2)$$

$$X_n = \frac{2\left[(L-p)\sum_{j=1}^{n-1} X_j\right]\tan\theta}{\tan\theta + \tan(\Phi + 2n\theta)}$$

and $$X_1 = \frac{(L-p)\tan\theta}{\tan\Phi + \tan\theta} \quad (3)$$

where $X_n$ is the distance traveled along the axis of the cone between $(n-1)$ and the $n$th reflection, $p$ is the distance into the cone that the ingoing ray first cuts the axis, $X_i$ is the distance along the cone axis between the $i$th and $i+1$st reflection, L is the total length of the cone, and $i$ and $j$ are summation indices.

Where $\theta_n = \pi/2$, the ray will reverse its direction and emerge from the cone along the same path it entered. When $\theta_n > \pi/2$, the ray will reverse direction and emerge from the cone along a path different from that by which it entered the cone. Under these conditions, the relation between the number of reflections after the ray reverses direction and the axial distance traveled toward the aperture is $$\zeta = (L-l) + \sum_{i=1}^{k} Z_i \quad (4)$$

$$Z_n = \frac{2\left[(L-l) + \sum_{j=1}^{k-1} Z_j\right]\tan\theta}{\tan[\alpha - (2k-1)\theta] - \tan\theta}$$

and $$Z_1 = \frac{2(L-l)\tan\theta}{(\tan\alpha - \theta) - \tan\theta} \quad (5)$$

where $\zeta$ is the distance along the axis the outward going ray travels from the cone apex, $Z_i$ is the distance along axis between the $i$th and the $i+1$st reflections of the outgoing ray, $\alpha$ is the angle of incidence of the ray on the truncated end of cone and $\alpha = \pi - (\theta_n + 2\theta)$. The ray will also reverse direction when $(\Phi + 2n\theta) \geq \pi/2$.

If we have $\theta_n < \pi/2$ and $(\Phi + 2n\theta) \geq \pi/2$, the distance traveled toward the aperture is given by $$Z_0 = \frac{2(L-l)\tan\theta}{\tan(\alpha + \theta) - \tan\theta} \quad (6)$$

where $Z_0$ is the distance along the axis between the reflection upon which the ray changes direction (to go outward) and the next reflection. From the $(n+1)$ reflection, Equation 4 applies. All the $Z_i$ are given here as positive.

Figure 2B:
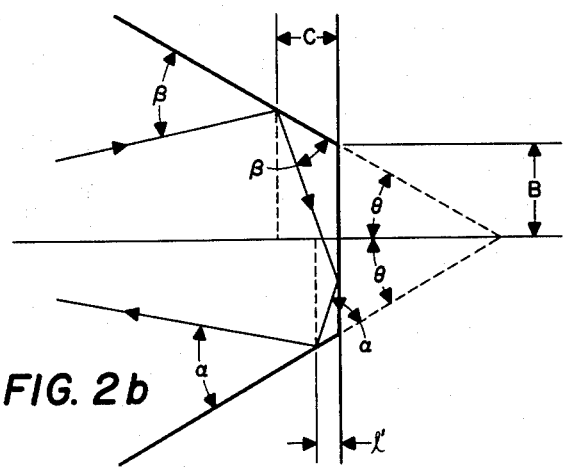
FIG. 2b is a schematic drawing showing the geometrical relationship between an incoming ray and the dimensions of the cone, as the ray is reflected from the truncated end of the cone.

If the ray reflects from the truncated end of the cone, as shown in FIG. 2b, the axial distance from this end to the point of next reflection is given by $$l' = \frac{B - C[\tan(\beta + \theta) - \tan\theta]}{\tan(\beta + \theta) - \tan\theta} \quad (7)$$

where $l'$ is the distance along the axis between the truncated end and the first reflection of ray after leaving the truncated end, B is the radius of the truncated end of the cone, C is the distance along the axis between the truncated end and the first reflection of the ray prior to hitting the truncated end, and $\beta$ is the angle of incidence of the ray on the reflection prior to hitting the truncated end of the cone. From this point, Equation 4 applies, with $\alpha = \beta$. If the ray reflects only from the truncated end, it emerges from the cone with no further reflections.

The following table, Table I, a tabulation of the number of reflections experienced by an incoming ray as a function of the entrance angle, is based on the equations given above.

*Table I.—Number of reflections as a function of incoming angles*

| Φ° | No. of Reflections | Φ° | No. of Reflections | Φ° | No. of Reflections |
|---|---|---|---|---|---|
| 0.0 | 1 | 4.0 | 11 | 18.0 | 9 |
| 0.33 | 1 | 5.0 | 11 | 20.0 | 9 |
| 0.50 | 2 | 6.0 | 11 | 22.5 | 9 |
| 1.0 | 4 | 7.0 | 11 | 24.0 | 9 |
| 1.5 | 4 | 8.0 | 11 | 26.0 | 8 |
| 2.0 | 6 | 10.0 | 11 | 28.0 | 8 |
| 2.5 | 10 | 12.0 | 10 | 30.0 | 8 |
| 3.0 | 11 | 15.0 | 10 | 32.0 | 8 |

Figure 3:
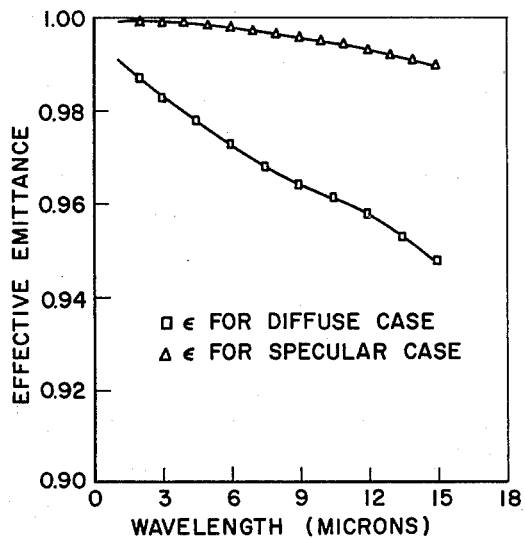
FIG. 3 is a graph showing the calculated spectral emittance of the conical cavity, assuming the internal surface to be either a perfect specular reflector or a perfect diffusing reflector.

The emittance values of the blackening material and the data in Table I were used to calculate the effective emittance of the conical receiver for the case of a perfectly specular reflecting wall, and the results are plotted in FIG. 3. For the calculation, it was assumed that any ray undergoing eight or more reflections was completely absorbed and that "$p$" equalled 1 mm. The effective emittance for the case of the perfectly diffusing reflecting wall was calculated by using Gouffé's analysis, aforementioned. Although J. C. DeVos states, in the publication Physica 20, 669 (1954), that Gouffé overcorrects the emittance value, the latter's calculations were used as a conservative lower limit. The effective emittance of the receiver for this case is also plotted as a function of wavelength in FIG. 3.

Figure 4:
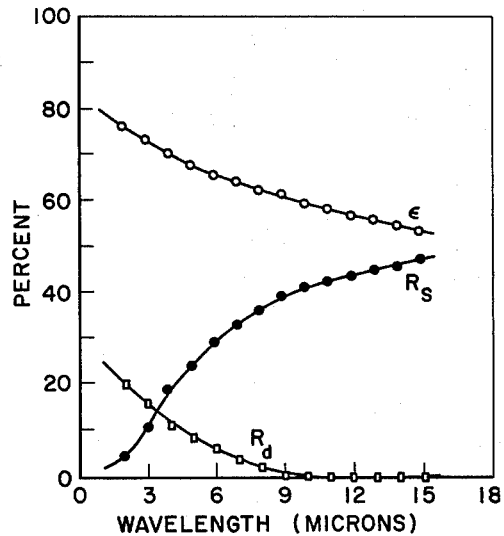
FIG. 4 is a graph showing spectral emittance and reflectance of the graphite blackening material.

The curves for these two cases are taken as defining upper and lower limits for the effective blackness of the conical receiver; but to estimate the blackness of the receiver more accurately, it is necessary to know the character of the reflected energy. The spectral reflectance of the colloidal graphite was therefore measured on a Perkin-Elmer spectrophotometer, and in addition, the transmittance of the material when applied to a transparent substrate was measured. The samples exhibited no transmission in the 2- to 15-micron region. The specular reflectance $R_s$ and emittance $\epsilon$ of the blackening material are shown in FIG. 4. Since the transmission of the material was zero, the diffuse reflectance $R_d$ can be calculated from $$R_d = 1 - (R_s + \epsilon)$$

Figure 5:
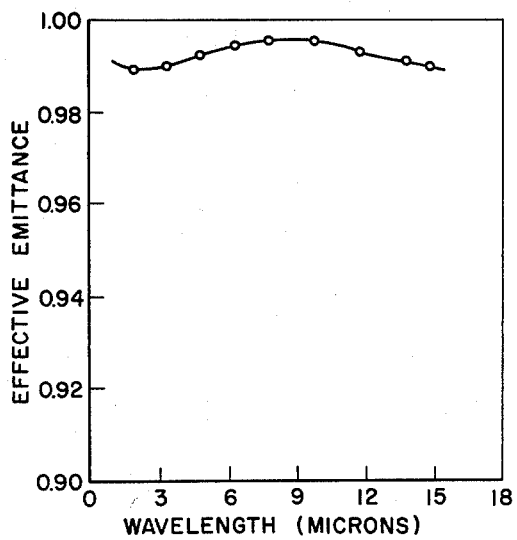
FIG. 5 is a graph showing spectral emittance of the black detector when the specular and diffuse reflectance of the blackening material is taken into account.

The calculated diffuse reflectance is also plotted as a function of wavelength in FIG. 4. By using the diffuse and specular reflectance ratios, the calculated emittance curves were proportionately adjusted so that a more realistic evaluation of the receiver blackness was obtained. The adjusted emittance of the black detector is shown in FIG. 5.

The above analysis is obviously based upon several assumptions. It was assumed that the specular absorptance of the blackening material is independent of the angle of incidence. Since the analysis is two-dimensional, rays that do not cross the axis of the cone were not taken into account. Further, an isotropic energy distribution from a point source was assumed. It is difficult to analyze the extent to which the performance of the receiver was affected by these conditions. These assumptions, however, appear to have been justified by experimental evidence.

Figure 6:
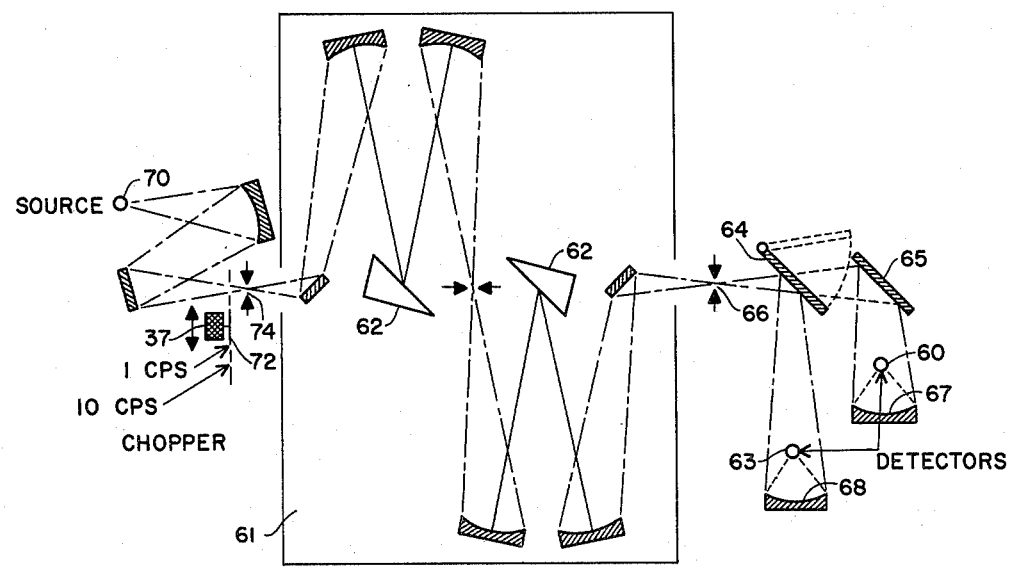
FIG. 6 is a diagrammatic sketch showing the arrangement of optical components used in spectral-response measurements.

Referring to FIG. 6, the black detector 60 was used as a unity reference at the output of a Leiss double monochromator 61 equipped with sodium chloride prisms, 62 and the spectral response of several commercial detectors at 63 was measured as a function of wavelength.

An optical bench (not shown) constructed of aluminum plate was firmly attached to the monochromator base at the rear of the instrument. Two flat first-surface mirrors 64 and 65 were mounted on the bench in line with the exit slit 66 and so positioned that they reflected the energy into the condensing mirrors 67 and 68 for the detectors 60 and 63 at right angles. The first mirror 64 was mounted so that it could be rotated out of the beam and thus allow the beam to be reflected by the second mirror 65. The optical alignment of the rotating mirror 64 was regulated by a hardened-steel stop (not shown) in such a way that the position of the mirror determined which detector would be irradiated by the energy from the monochromator 61.

The platinum-wire starting heater element from a Nernst glower was used as the energy source 70. A variable autotransformed adjusted the temperature of the source, and thus constant output energy from the monochromator over the spectral region from 1 to 14 microns was essentially maintained. This source 70 provided nearly as much energy as a Nernst element and was much easier to control.

A single chopper disk 72, driven by a 60-r.p.m. synchronous motor 73, was arranged to chop the entrance slit 74 of monochromator 61 at either 1 or 10 c.p.s. An amplifier with a bandpass of 0.5 c.p.s. and a center frequency of 1 c.p.s. (not shown) was used with the black detector 60, and a 10 c.p.s. amplifier with a 1 c.p.s. bandpass (not shown) was used for the channel of the detector 63 undergoing evaluation. The chopper 72, which was mounted on a rail provided with mechanical stops (not shown) to facilitate changing the chopping frequencies for the rear of the instrument, was controlled by means of a string loop. FIGURE 6 diagrammatically shows the relative positions of the optical components.

To experimentally determine the validity of the assumptions made in calculating the blackness of the receiver, the condensing mirror 67 for the black detector 60 was adjusted so that the energy image fell at different positions (and was incident at different angles) within the cavity. The response of the black detector and of a radiation thermocouple were then measured as a function of wavelength for each position of the energy image. Any change in the response curve would have indicated a change in the spectral response of the black detector. Since no change in detector response was observed, it was concluded that the asumptions used in the calculations were valid within the observation error of 2 percent.

Figure 7:
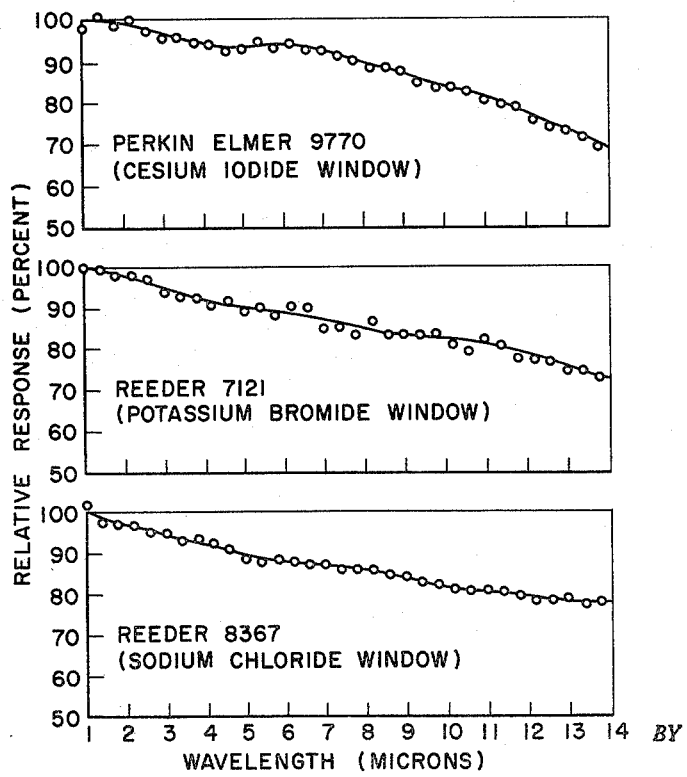
FIG. 7 shows graphs of relative spectral response for three thermocouples.

To measure the spectral-response curves of the commerical thermocouples, response data were taken in the 1- to 14-micron region for the black detector and the thermocouple, first in one position on the optical bench, and again with their positions reversed. Thus the relative spectral response of the thermocouple was obtained by taking response of the black detector as unity. The results of the measurements made on two Reeder thermocouples and one Perkin-Elmer thermocouple are shown in FIG. 7.

The black detector of the present invention has been used experimentally as a standard for the spectral calibration of other long-wavelength infared detectors. The effective blackness of the detector in the 1- to 15-micron region is constant within 2 percent. Such accuracy is considered satisfactory for most detector-calibration purposes.

Recent emittance measurements on commercial blackening materials indicate an absorption of greater than 90 percent out to 25 microns. When applied to the black detector, such a material will yield an effective emittance greater than 0.99.

The experimental data show that the relative spectral response of commercial thermocouples decreases as much as 30 percent in the 15-micron region. If the slope of the spectral-response curves remains constant, considerable loss of absorption will occur in the long-wavelength region. Since commercial thermocouples ar generally used as spectral standards, significant errors may be expected in calibrations performed in the long-wavelength region if this decline in spectral response is not taken into account.

Obviously many modifications and variations of the present invention are possible in the light of the above

What is claimed is:

1. A black radiation detector standard for the spectral calibration of long-wavelength infrared detectors and the like comprising:
   (a) a hollow thin-wall cone of highly electrical and heat conductive material having the base thereof open to expose the conical cavity to incident radiation,
   (b) the internal surface of said cone being blackened with a coating of material having high absorption characteristics in the long wavelength region of 1–15 microns, this absorption of the coating together with the conical geometry of said cavity resulting in absorption of nearly all incident radiation independent of the wavelength of the incident radiation,
   (c) a thermocouple junction to transduce the incident radiant energy into an electrical signal attached directly to the outer surface of said cone at a point midway between the base and apex of the cone,
   (d) the other ends of the two wires of the thermocouple being electrically fastened to respective electrode support means said thermocouple wires being the only means of mechanical support for said cone to reduce thermal conductance from said cone to a minimum for maximum sensitivity of the detector.

2. A device as in claim 1 wherein the apex end of said cone is very slightly truncated.

3. A black radiation detector as in claim 1 wherein said thermocouple junction is of one mil diameter Bi, Bi-Sn wires.

4. A device as in claim 1 wherein the internal surface of said cone is blackened with a coating of colloidal graphite.

5. A device as in claim 1 wherein the conical cavity of said cone has a 15° solid angle, a base of 2 millimeters diameter, a height of 7.6 millimeters and a wall thickness of 1.2 microns.

6. A device as in claim 5 wherein said cone is fabricated of copper and has a total mass of 0.25 milligrams.

References Cited by the Examiner
UNITED STATES PATENTS

| | | | |
|---|---|---|---|
| 2,497,783 | 2/50 | Markson | 73—355 |
| 2,993,138 | 7/61 | Scott | 73—355 X |

RALPH G. NILSON, *Primary Examiner.*

JAMES W. LAWRENCE, *Examiner.*